United States Patent [19]
McFarland et al.

[11] Patent Number: 6,013,199
[45] Date of Patent: Jan. 11, 2000

[54] PHOSPHOR MATERIALS

[75] Inventors: Eric McFarland, Santa Barbara; Earl Danielson, Palo Alto; Martin Devenney, Mountain View; Casper Reaves, San Jose; Daniel M. Giaquinta, Sunnyvale; Damodara M. Poojary, Cupertino; Xin Di Wu, San Jose; Josh H. Golden, Santa Cruz, all of Calif.

[73] Assignee: Symyx Technologies, Santa Clara, Calif.

[21] Appl. No.: 09/019,425

[22] Filed: Feb. 5, 1998

Related U.S. Application Data

[60] Provisional application No. 60/039,882, Mar. 4, 1997.

[51] Int. Cl.$^7$ .............................. C09K 11/78; C09K 11/53
[52] U.S. Cl. .................................. 252/301.4 R; 423/263; 423/593
[58] Field of Search ..................... 252/301.4 R, 301.4 H, 252/301.4 S, 301.4 F, 301.6 R; 423/263, 331, 326, 341, 463, 511, 593

[56] References Cited

U.S. PATENT DOCUMENTS

| | | | |
|---|---|---|---|
| 3,511,785 | 5/1970 | Ropp ................................. | 252/301.4 R |
| 3,586,636 | 6/1971 | Kano et al. ....................... | 252/301.4 R |
| 4,550,256 | 10/1985 | Berkstresser et al. ........... | 252/301.4 R |

FOREIGN PATENT DOCUMENTS

| | | | |
|---|---|---|---|
| 54-34710 | 10/1979 | Japan .............................. | 252/301.4 S |
| 57-168982 | 10/1982 | Japan .............................. | 252/301.4 R |

OTHER PUBLICATIONS

Chemica Abstract citation: 71:56198; Danelon Mastromonaco et al, Ann. Chim. (ROME) 59(5), pp. 465–87, 1969. no month.

Chrmical Abstract Citation 91:184289; Jesionek, Pr. Osrodka Badaw.–Rozwojowego tech. Telew. (1), pp. 31–43, 1978. no month.

Grant & Hackh's Chemical Dictionary, p. 245, Oct. 19, 8.

G. Blasse, et al., "Characteristic Luminescence," *Philips Technical Review*, vol. 31, No. 10, pp. 304–332, (1970). no month.

G. Blasse and B.C. Grabmaier, "Radiative Return to Ground State: Emission," in *Luminescent Materials* (Springer–Verlag, Berlin), pp. 33–70, (1994). no month.

G. Blasse, "Luminescent Materials: Is There Still News," *Journal of Alloys and Compounds*, vol. 225, pp. 529–533, (1995). no month.

A. Cocco, et al., "Ricerche Sulle Relazioni Tra Le Fasi Allo Stato Solido Nel Sistema Quaternario: $CeO_2$–BaO–CaO–SrO," *Ann. Chim.*, vol. 59, No. 6, pp. 495–501, (1969).

F.J. DiSalvo, "Solid–State Chemistry: A Rediscovered Chemical Factor," *Science*, vol. 247, pp. 649–655, (1990). no month.

H.E. Hoffdraad, "Charge–Transfer Spectra of Tetravalent Lanthanide Ions in Oxides," *Journal Inorg. Nucl. Chem.*, vol. 37, pp. 1917–1921, (1975). no month.

(List continued on next page.)

M. Trömel, "Zur Strukter Der Verbindungen Vom $Sr_2PbO_4$–Typ," *Naturwiss*, vol. 52, pp. 492–493, (1965). no date.

A. Vecht, "Phosphors for Color Emissive Displays," *SID Seminar Lecture Notes*, vol. 2, pp. F–2/3–F2/51, (1996). no date.

Yonemura, et al., *Nippon Kagaku Kaishi*, vol. 2, pp. 156–164, (1987). no date.

*Primary Examiner*—C. Melissa Koslow

[57] ABSTRACT

This invention relates generally to new luminescent materials. Specifically, this invention relates to the discovery of phosphor materials in the forms of $A_2BX_4$, $ABX_{4-y}$:M and $A_{3-z}B_5X_{12}$:$M_z$. More specifically, this invention relates to the discovery of phosphor materials having compositions of matter in the forms, $Sr_2CeO_4$, $(Y_{0.82}Al_{0.07}La_{0.06})VO_4$:$Eu_{0.05}$ and $(Y_{0.5}Gd_{0.5})_{2.97}(Al_{0.5}Ga_{0.5})_5O_{12}$:$CeO_{0.03}$.

6 Claims, 11 Drawing Sheets

(1 of 11 Drawing Sheet(s) Filed in Color)

OTHER PUBLICATIONS

K.L. Keester, et al., "Crystal Chemistry and Properties of Phases in the System SrO–PbO–O," *Journal of Solid State Chemistry,* vol. 2, pp. 68–73, no month.

M. Danelon Mastromonaco, et al., "Reazioni Allo Stato Solido Nei Sistemi Tra $CeO_2$ Ed Ossidi Dei Metalli Alcalino–Terrosi, Conduttivita Elettrica E Strutura Delle Fasi Presenti," *Ann. Chem.,* vol. 59, No. 5, pp. 465–487, (1969). no month.

J.L. Ouweltjes, "Luminescence and Phosphors," in *Modern Materials,* (Academic Press, New York), vol. 5, pp. 161–257, (1965). no month.

C.R. Ronda, "Phosphors For Lamps and Displays; An Applicational View," *Journal of Alloys and Compounds,* vol. 225, pp. 534–538, (1995). no month.

J.R. Rodgers, et al., "Trends in Advanced Materials Data: Regularities and Predictions," *MRS Bulletin,* pp. 27–29, (1993). no month.

R.C. Rop, *The Chemistry of Artificial Lighting Devices,* (Elsevier, Amsterdam), (1993). no date.

B.M.J. Smets, "Phosphors Based On Rare–Earths, A New Era in Fluorescent Lighting," *Materials Chemistry and Physics,* vol. 16, pp. 283–299, (1987). no date.

Alok M. Srivastava and Thomas F. Soules, *Luminescent Materials (Phosphers),* vol. 15, pp. 562–584. no date.

BLUE
LUMINESCENT
REGION
(Sr, Sn, Ce)

| x , y | CIE 1931 x coordinate | CIE 1931 y coordinate |
|---|---|---|
| 0 , 0 | 0.413 | 0.553 |
| 0.1 , 0.1 | 0.418 | 0.549 |
| 0.2 , 0.2 | 0.417 | 0.548 |
| 0.3 , 0.3 | 0.421 | 0.545 |
| 0.4 , 0.4 | 0.419 | 0.546 |
| 0.5 , 0.5 | 0.424 | 0.543 |
| 0.6 , 0.6 | 0.435 | 0.536 |
| | | |
| 0.7 , 0 | 0.479 | 0.508 |
| 0.8 , 0 | 0.490 | 0.499 |
| 0.1 , 0 | 0.498 | 0.493 |
| | | |
| 0 , 0.1 | 0.396 | 0.559 |
| 0 , 0.2 | 0.381 | 0.564 |
| 0 , 0.3 | 0.363 | 0.570 |
| 0 , 0.4 | 0.350 | 0.572 |
| 0 , 0.5 | 0.342 | 0.574 |
| 0 , 0.6 | 0.336 | 0.574 |
| | | |
| 0.2 , 0.4 | 0.442 | 0.532 |
| 0.3 , 0.8 | 0.452 | 0.524 |

Fig. 8B

PHOSPHOR MATERIALS

CROSS REFERENCE TO RELATED APPLICATIONS

This application claims the benefit of U.S. provisional patent application Ser. No. 60/039,882, filed Mar. 4, 1997, the teachings of which are incorporated herein by reference.

FIELD OF INVENTION

The present invention relates generally to new luminescent materials. Specifically, the present invention relates to the discovery of phosphor materials having the formulas $A_2BX_4$, $ABX_{4-y}$:M and $A_{3-z}B_5X_{12}$:$M_z$, and to methods of using such phosphor materials for generating luminescence. In specific embodiments, this invention relates to the discovery of phosphor materials having the formulas $Sr_2CeO_4$, $(Y_{0.82}Al_{0.07}La_{0.06})VO_4$:$Eu_{0.05}$ and $(Y_{0.5}Gd_{0.5})_{2.97}(Al_{0.5}Ga_{0.5})_5O_{12}$:$Ce_{0.03}$.

BACKGROUND OF THE INVENTION

Luminescent materials, i.e., phosphors, are used in many devices including fluorescent lamps, plasma-panel display gas-discharge cells, electron-beam display devices, and other emissive displays, etc. These materials are often polycrystalline inorganic solids that emit radiation when stimulated with fast electrons, X-rays, ultraviolet (UV) photons, or some other form of radiation. The discovery and development of new solid state materials with efficient visible luminescence (i.e., phosphors) is of importance both for the next generation of flat panel displays (see, Maruska, et al., Mat. Res. Soc. Symp. Proc., 345:269 (1994)), for lighting applications (see, Butler, Fluorescent Lamp Phosphors, Penn. State Univ. Press, Univ. Park (1980)), and the like.

The preparation and discovery of new solid state inorganic compounds, however, is limited by the lack of a general framework that provides broad based predictive synthetic strategies and theories. Due to the lack of predictive tools available to the solid state inorganic chemist, the preparation of new phosphors has generally been restricted to serial synthesis and analysis techniques. As such, serial synthesis and testing of powder phosphors has been the discovery and development paradigm for the last one hundred and fifty years. Such techniques have resulted in the discovery of less than one hundred phosphors suitable for commercial use (see, Vecht, SID Seminar Lecture Notes, 2, F-2/3 (1996); Ropp, The Chemistry of Artificial Lighting Devices, Elsevier, Amsterdam, pp. 414–656 (1993)). At the same time, efforts to predict basic solid state properties from theory, including intrinsic or extrinsic luminescent efficiency, have been unsuccessful (see, DiSalvo, Science, 247:649 (1990)). Using traditional methods, fewer than 1% of all possible ternary compounds and less than 0.01% of all possible quaternary compounds have been synthesized heretofore (see, Rodgers, et al., Mat. Res. Bull., 18:27 (1993)).

In view of the foregoing, it is readily apparent that there remains a need in the art for novel phosphor materials that can be used for generating luminescence. The present invention fulfills this and other needs.

SUMMARY OF THE INVENTION

The present invention relates to the discovery of luminescent phosphor materials. Specifically, this invention relates to the discovery of new phosphor materials having the formulas $A_2BX_4$, $ABX_{4-y}$:M and $A_{3-z}B_5X_{12}$:M, using combinatorial synthesis and screening methodologies. More particularly, in one embodiment, the present invention relates to phosphor materials having the general formula:

$$A_2BX_4.$$

In the above formula, A is a cation selected on the basis of size, electronegativity and the tendency of the ion to crystallize in a 6 or higher coordination with X. B, in the above formula, is a cation selected on the basis of size and the tendency of the ion to crystallize in an octahedral or distorted octahedral coordination. X, in the above formula, is a member selected from the group consisting of O, F, S, and mixtures thereof. In a specific embodiment, the phosphor material has the formula $Sr_2CeO_4$.

In another embodiment, the present invention relates to phosphor materials having the general formula:

$$ABX_{4-y}:M.$$

In the above formula, A is a trivalent cation selected from the group consisting of Y, La, Al, all lanthanides and mixtures thereof. B, in the above formula, is a pentavalent cation selected from the group consisting of V, Nb, Ta, partial substitutions of $3^+$ and $4^+$ cations and mixtures thereof. X is a member selected from the group consisting of O, F, S, Se, Te, halogens, and mixtures thereof. The index "y" is selected such that it greater than or equal to zero and less than or equal to one, i.e., $0 \leq y \leq 1$. M, in the above formula, is a lanthanide ion. In a specific embodiment, the phosphor material has the formula $(Y_{0.82}Al_{0.07}La_{0.06})VO_4$:$Eu_{0.05}$.

In another embodiment, the present invention relates to phosphor materials having the general formula $$A_{3-z}B_5X_{12}:M_z$$

In this embodiment, A is selected from the group consisting of Y, all lanthanides and mixtures thereof. B is selected from the group consisting of Al, Ga, In, Se, and mixtures thereof. X is selected from the group consisting of O, F, S, and mixtures thereof. M is selected from the group consisting of Ce, Th, Pr, Sm, Eu, Dy, Ho, Tm, and mixtures thereof. Z is a number from 0 to about 0.5. In a specific embodiment, the phosphor material has the formula $(Y_{1-x}Gd_x)_{3-z}(Al_{1-y}Ga_y)_5O_{12}$:$Ce_z$, where x=0.5, y=0.5, and z=0.03.

Other features, objects and advantages of the invention and its preferred embodiments will become apparent from the detailed description which follows.

BRIEF DESCRIPTION OF THE DRAWINGS

The file of this patent contains at least one photograph executed in color. Copies of this patent with color photograph(s) will be provided by the Patent and Trademark Office upon request and payment of the necessary fee.

FIGS. 8A, 8B and 8C illustrates the ability to tune the color of photoluminescence in the $(Y_{1-x}Gd_x)_{3-z}(Al_{1-y}Ga_y)_5O_{12}:Ce_z$ phosphor system.

DEFINITIONS

Figure 1:
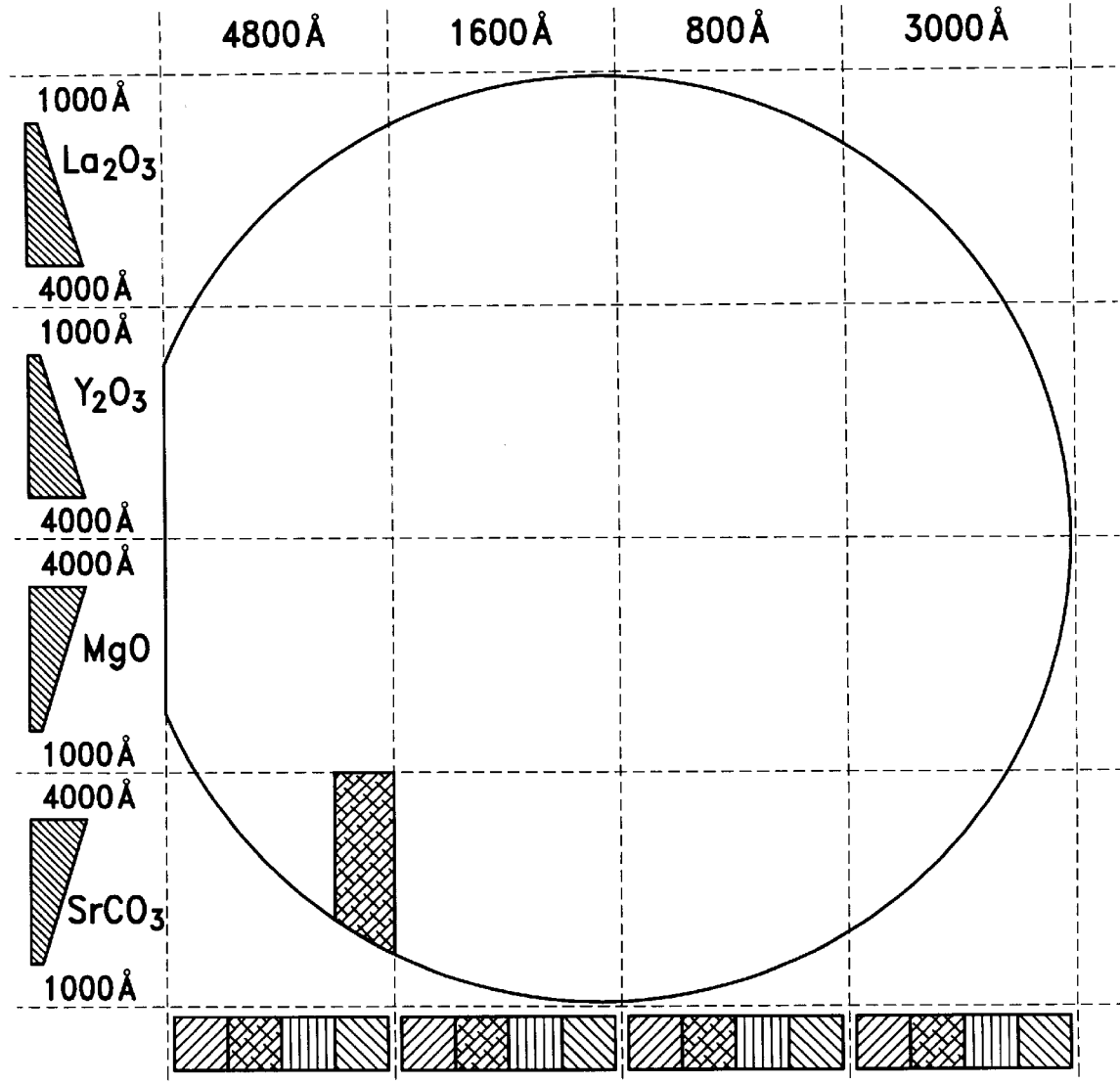
FIG. 1 illustrates a combinatorial array of rare-earth ion activated mixed oxide phosphors prepared with the stoichiometry of $(A_iB_jC_k)_mO_n$:M (wherein A, B, C=Al, La, Mg, Sn, Sr, V, Y, and M=Eu, Th, Tm, Ce) showing the thickness of target materials deposited on the substrate. There are four columns deposited first with constant thickness of $SnO_2$, V, $Al_2O_3$:V(15:8) and $Al_2O_3$, and four rows with linearly varying thickness of $La_2O_3$, $Y_2O_3$, MgO and $SrCO_3$ layered on the columns to divide the substrate into sixteen host lattice subregions and, finally, within each subregion, columns of rare earth oxide $Eu_2O_3$, $Tb_4O_7$, $Tm_2O_3$ and $CeO_2$ were deposited in linearly varying thickness.

Component: "Component" is used herein to refer to each of the individual chemical substances that act upon one another to produce a particular material. Component materials can include, for example, strontium carbonate, tin dioxide and cerium dioxide. Component materials are also referred to as "source materials."

Target Material: A "target material" is a material that can be composed of elements, compounds, chemicals, molecules, etc., that is evaporated, vaporized, boiled, sublimed, ablated, etc., from the surface of a container or holder so that it can condense onto a substrate during the synthesis of materials. A target material is also referred to herein as a "source material."

Substrate: A "substrate" is a material having a rigid or semi-rigid surface. The substrate can be, for example, silicon. In many embodiments, at least one surface of the substrate will be substantially flat, although in some embodiments it may be desirable to physically separate synthesis regions for different materials with, for example, dimples, wells, raised regions, etched trenches, or the like. In some embodiments, the substrate itself contains wells, raised regions, etched trenches, etc., which form all or part of the synthesis regions. According to other embodiments, small beads or pellets can be provided on the surface within dimples or on other regions of the surface or, alternatively, the small beads or pellets can themselves be the substrate.

Predefined Region: A "predefined region" is a localized area on a substrate which is, was or is intended to be used for formation of a selected material. The predefined region can have any convenient shape, e.g., circular, rectangular, elliptical, wedge-shaped, etc. Additionally, the predefined region, i.e., the reaction site, can be a bead or pellet which is coated or impregnated with a reactant component(s) of interest. In some embodiments, a predefined region and, therefore, the area upon which each distinct material is synthesized is smaller than about 25 cm$^2$, preferably less than 10 cm$^2$, more preferably less than 5 cm$^2$, even more preferably less than 1 cm$^2$, still more preferably less than 1 mm$^2$, and even more preferably less than 0.5 mm$^2$. In most preferred embodiments, the regions have an area less than about 10,000 mm$^2$, preferably less than 1,000 mm$^2$, more preferably less than 100 mm$^2$, and even more preferably less than 10 mm$^2$.

DETAILED DESCRIPTION OF THE INVENTION AND PREFERRED EMBODIMENTS

The present invention provides phosphor materials having the following general formula:

$A_2BX_4$

In the above formula, A is a cation that is chosen on the basis of size, electronegativity and the crystallographic environment in which the ion tends to crystallize with oxygen, fluorine or sulfur (represented by X in the above formula). Thus, the A-site can be a large, electropositive element in no less than 6-fold coordination that is acting primarily as an ionic space-filler between chains of edge-shared octahedra of cation B. In a preferred embodiment, A is an alkaline earth metal including, but not limited to, Be, Mg, Ca, Sr, Ba, Ra and combinations thereof. In the above formula, B is a cation that is chosen on the basis of size and the tendency of the ion to crystallize in octahedral or distorted octahedral coordinations, i.e., any 6-coordination with oxygen. In a preferred embodiment, B is selected from the group consisting of Ce, Th, Sn, Ge, Pb, Sb, Si, and mixtures thereof. An example is seen in the parent structure, $Sr_2PbO_4$, (Trömel, *Naturwiss.* 52:492 (1965); Kester and White, *Journal of Solid State Chemistry*, 2:68–73 (1970). The structure of $Sr_2PbO_4$ consists of isolated chains of edge-shared Pb(IV) octahedra separated by seven-coordinate strontium. In one preferred embodiment of this invention, the A site consists entirely of $Si^{2+}$, while the B site consists entirely of $Ce^{4+}$. An ionic radius ratio relationship exists between the radii of the large (A) and small (B) cations such that, under the appropriate conditions, other substitutions are possible. Such substitutions can include partial or total substitutions where the total ionic charge on all A and B cations equals $^{+}8$.

In one preferred embodiment of this invention, the $A_2BX_4$ phosphor material is $Sr_2CeO_4$. This compound has previously been studied for its ionic conductivity and photocatalytic (but not phosphor) properties; the structure of $Sr_2CeO_4$ was previously described as fluorite-related with a triclinic unit cell (see, Yonemura, et al., *Nippon Kagaku Kaishi*, 2:156–164 (1987); Cocco, et al., *Ann. Chim.* (Rome), 59(6) :495–501 (1969); Mastromonaco, et al., *Ann. Chim.* (Rome), 59(5):465–487 (1969); Cocco, et al., *Chim. Appl.*, 22(15) 1966)). However, it has now been discovered that $Sr_2CeO_4$ is a luminescent phosphor material which possesses a new structure type for a luminescent oxide built up from one-dimensional chains of edge sharing $CeO_6$ octahedra, with two terminal O atoms per Ce center that are isolated from one another by $Sr^{2+}$ cations.

More particularly, the $Sr_2CeO_4$ samples had an orthorhombic cell with a=6.11897(9)Å, b=10.3495(2)Å and c=3.5970(1)Å, which was confirmed by the structure solution from power diffraction data in space group Pbam and the high quality of the Rietveld refinement of the structure. The structure of $Sr_2CeO_4$ is highly anisotropic and is a one-dimensional inorganic oxide phosphor. The structure consists of linear chains of edge-sharing $CeO_6$ octahedra that run parallel to the crystallographic [001] direction with a repeat distance of 3.597Å. The linear chain of octahedra has two trans terminal O atoms perpendicular to the plane defined by the four equatorial O atoms. The terminal Ce—O bonds are shorter than the equatorial bonds by about 0.1Å. The excitation and emission spectra of $Sr_2CeO_4$ displayed broad maxima at 310 and 485 nm, respectively, with the emission appearing of blue-white color to the eye (C.I.E. 1931 chromaticity coordinates x=0.198, y=0.292). This phosphor is also effectively excited by X-rays and exhibits efficient cathodoluminescence (5.1 lumens watt$^{-1}$). The emission from $Sr_2CeO_4$ is quite broad and has a long excited state lifetime (about 51.3±2.4 μsec) compared to d–f transitions in the $Ce^{3+}$ excited states.

The phosphor materials having the general formula $A_2BX_4$ were synthesized using combinatorial techniques. More particularly, a combinatorial array of chemically distinct compounds was synthesized using either an electron beam evaporation system or sol-gel techniques on silicon substrates. In one embodiment, combinations of stationary and moving masks and shutters were used to control deposition of materials onto predefined regions of the substrate. In another embodiment, inorganic luminescent oxides from sol-gel precursor solutions were used to make a library of compounds by depositing each sol-gel solution onto a substrate to form an array. The prepared arrays were annealed to induce formation of the desired phases.

Using the above combinatorial techniques, densities ranging from 1 to 100,000 different possible compounds per square centimeter can be synthesized. In a preferred embodiment of this invention, an array of rare-earth ion activated mixed oxide thin film phosphors was synthesized with a density of 600 compounds per square centimeter and a stoichiometry of $(A_iB_jC_k)_mO_n$:M, wherein A, B, C=Al, La, Mg, Sn, Sr, V, Y, and M=Eu, Th, Tm, Ce (see, FIG. 1).

After thermal processing at a variety of temperatures, libraries generated using the methods of the present invention were rapidly screened for UV luminescence and chromaticity. High-throughput screening and characterization was performed by imaging the libraries with a spectrally filtered charge-coupled device (CCD) to estimate the chromaticity and relative luminance of the phosphor compounds in the library. Table 1 sets forth a subset of compounds from the entire library examined and sets forth the locations on the library of the extrinsically brightest red, green and blue phosphors of the present invention, within a constrained chromaticity space, along with their relative luminance and C.I.E. (1931) chromaticity coordinates.

TABLE 1

Representative high-throughput screening results for extrinsic phosphor properties obtained from combinatorial phosphor library. The spectrally filtered CCD images were used to determine the chromaticity as defined by the CIE (1931) coordinates and the extrinsic intensity was compared radiometrically to deep powder standards of the same color imaged simultaneously. Relative errors in chromaticity are approximately 15% and in relative luminance of approximately 10%.

| Elemental Components (Molar Ratio) | CIE-x | CIE-y | Relative Luminance | Rank in Library Within Color Group |
|---|---|---|---|---|
| Red | | | | |
| Y:V:Eu (0.34:0.60:0.06) | 0.65 | 0.35 | 1.00 | 1 (out of 1754) |
| Y:V:Eu (0.35:0.59:0.06) | 0.65 | 0.35 | 0.95 | 4 |
| Al:Y:V:Eu (0.37:0.29:0.30:0.04) | 0.64 | 0.35 | 0.53 | 149 |
| Al:La:V:Eu (0.34:0.31:0.28:0.07) | 0.64 | 0.34 | 0.27 | 380 |
| La:V:Eu (0.51:0.43:0.06) | 0.64 | 0.35 | 0.21 | 516 |
| Y:V:Eu (0.42:0.53:0.05) | 0.55 | 0.33 | 0.05 | 1694 |
| Green | | | | |
| Al:Mg:V:Tb (0.23:0.57:0.19:0.01) | 0.45 | 0.48 | 1.00 | 1 (out of 11281) |
| Al:Mg:V:Tb (0.22:0.59:0.18:0.01) | 0.42 | 0.52 | 0.92 | 2 |
| Mg:V:Ce (0.54:0.44:0.02) | 0.43 | 0.48 | 0.70 | 118 |
| Y:V:Tb (0.47:0.52:0.01) | 0.49 | 0.33 | 0.34 | 3233 |
| Sr:V:Ce (0.68:0.31:0.01) | 0.30 | 0.32 | 0.30 | 3426 |
| Al:La:V:Tb (0.32:0.26:0.40:0.02) | 0.35 | 0.41 | 0.23 | 3970 |
| La:V:Tb (0.61:0.36:0.03) | 0.33 | 0.33 | 0.15 | 6259 |
| Blue | | | | |
| Y:V:Tm (0.41:0.57:0.02) | 0.18 | 0.09 | 1.00 | 1 (out of 728) |
| Y:V:Tm (0.42:0.56:0.02) | 0.18 | 0.08 | 0.94 | 3 |
| Al:Y:V:Tm (0.38:0.31:0.30:0.01) | 0.19 | 0.11 | 0.76 | 29 |
| Al:Y:V:Tm (0.37:0.30:0.32:0.01) | 0.19 | 0.11 | 0.73 | 37 |
| Y:V:Tm (0.35:0.63:0.02) | 0.21 | 0.13 | 0.32 | 307 |
| Al:Y:V:Tm (0.31:0.25:0.43:0.01) | 0.25 | 0.20 | 0.18 | 645 |
| Y:V:Tm (0.41:0.57:0.02) | 0.25 | 0.19 | 0.17 | 689 |

Figure 2:
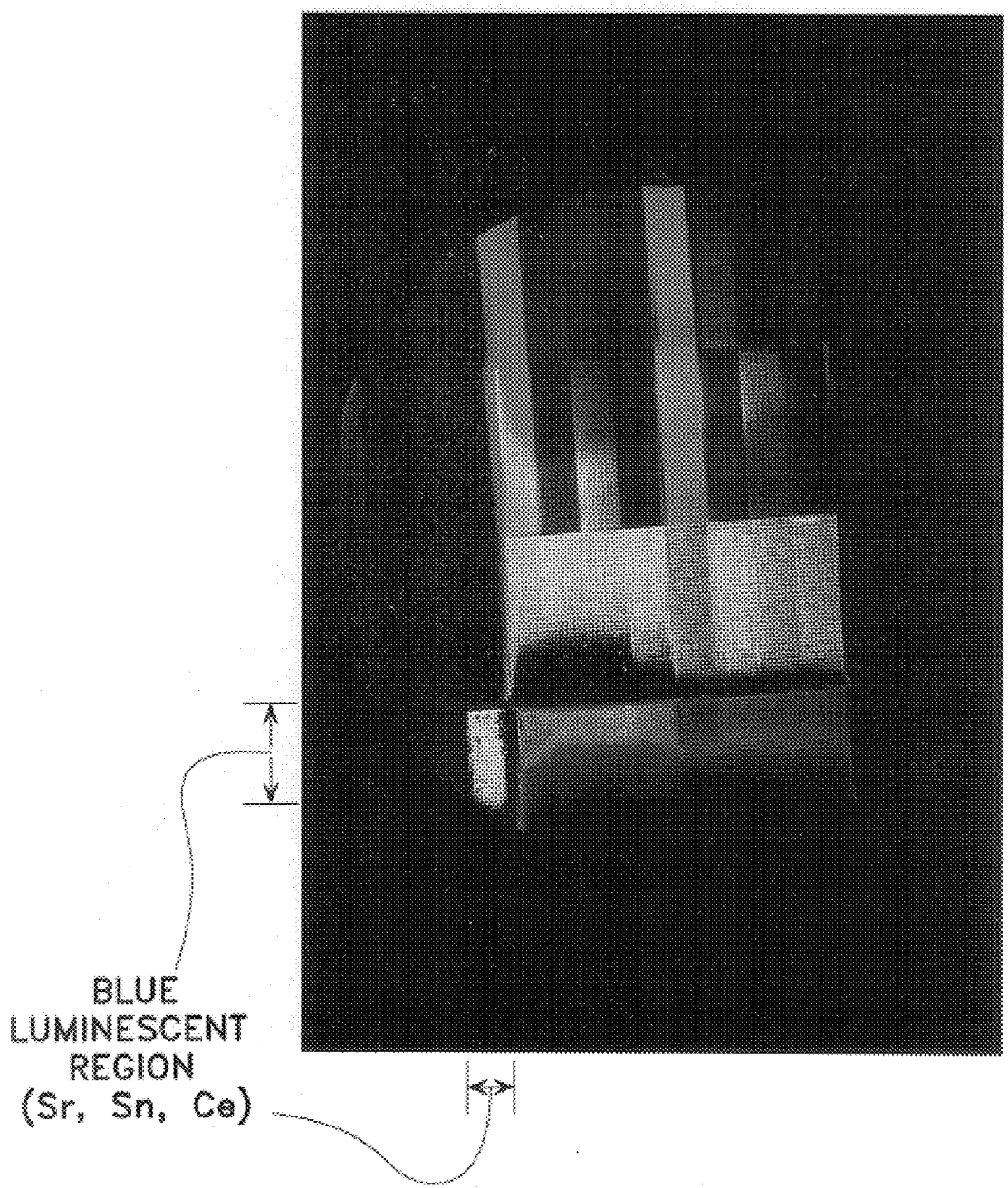
FIG. 2 illustrates a 254 nm UV-excited photoluminescence emission image of the library synthesized from the design map illustrated in FIG. 1.

A specific region of an array of rare-earth ion activated mixed oxide phosphors prepared with the stoichiometry described above and in FIG. 1 had a blue emission under 254 and 366 nm UV excitation (see, FIG. 2). This region was identified as a compound containing one or more of Sr, Ce and Sn. After luminescent regions on this array were identified, bulk phosphor powders were prepared, and the chemical composition and structure of the phosphor material was determined using techniques that include scanning electron microscopy and X-ray diffraction. X-ray diffraction of the bulk powder resulted in the identification of $Sr_2CeO_4$, having the general formula $A_2BX_4$.

In another embodiment, the present invention provides phosphor materials having the following general formula:

$ABX_{4-y}$:M.

In the above formula, A is a trivalent cation selected from the group consisting of Y, La, Al, all lanthanides and mixtures thereof. B, in the above formula, is a pentavalent cation selected from the group consisting of V, Nb, Ta, partial substitutions of 3+ and 4+ cations, and mixtures thereof. X is a member selected from the group consisting of O, F, S, Se, Te and halogens. M is selected from the group consisting of lanthanides, transition metals, and mixtures thereof. More specifically, M is selected from the group consisting of Ce, Cr, Mo, Ti, Bi, Pr, Nd, Sm, Eu, Tb, Dy, Ho, Er, Tm, and mixtures thereof. The index "y" is selected such that it is greater than or equal to zero and less than or equal to one, i.e., $0 \leq y \leq 1$. In another embodiment, y is less than 1.

Figure 4A:
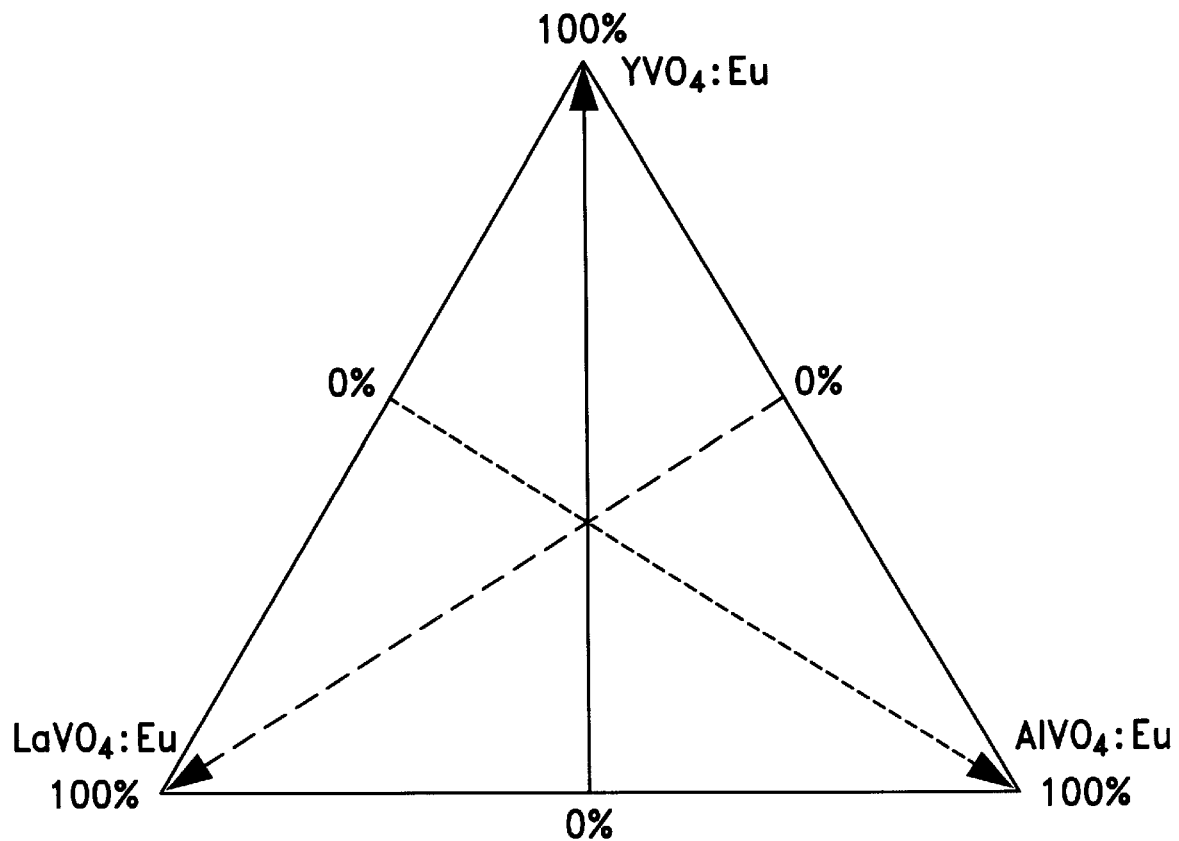
FIG. 4A illustrates a triangular library design map representing all possible stoichiometries of Y, Al, and La vanadates, formed by varying the host constituents linearly along three axes rotated by 120 degrees on a substrate with a uniform thickness of Eu and V.
Figure 4B:
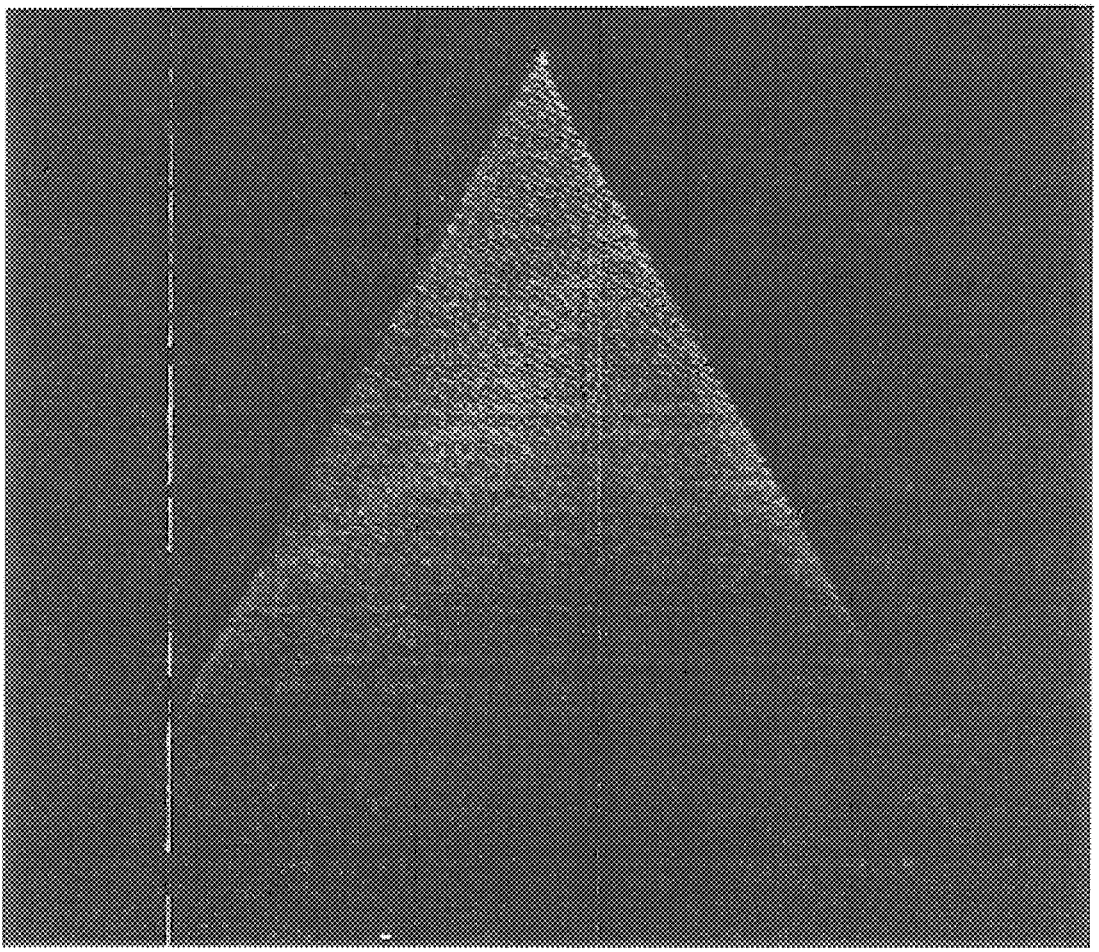
FIG. 4B illustrates a UV-excited photoluminescence emission image of the library synthesized from the design map shown in FIG. 4A.

In this connection, a phosphor library was designed according to FIG. 4A to explore the highest efficiency materials with desirable chromaticity as identified in the initial high-density exploration library (see, FIG. 1). To investigate and optimize these lead compounds, a library was designed which focused on the lead compositions and included lanthanum as a second Group IIIA host. Selected compositions of yttrium vanadates doped with lanthanum have been previously described as efficient lamp and cathodoluminescent phosphors (see, Yokota, et. al., Chem. Abstr., 75:103573). This comprehensive composition map represents all possible $Y_{0.95-n-m}La_nAl_m(VO_4)Eu_{0.05}$ compounds, wherein n is between about 0 and 0.95, and m is between about 0 and 0.95. In another embodiment, n is between about 0 and about 0.5, and m is between about 0 and about 0.5; more particularly, n is between about 0 and about 0.1, and m is between about 0 and about 0.1. A UV-excited photoluminescent image of the library is depicted in FIG. 4B. The most intense phosphor on the library with red chromaticity suitable for a commercial material was $(Y_{0.82}Al_{0.07}La_{0.06})VO_4{:}Eu_{0.05}$. This composition represents a new phosphor having the general formula $ABX_{4-y}{:}M$ with excellent extrinsic properties.

Figure 5:
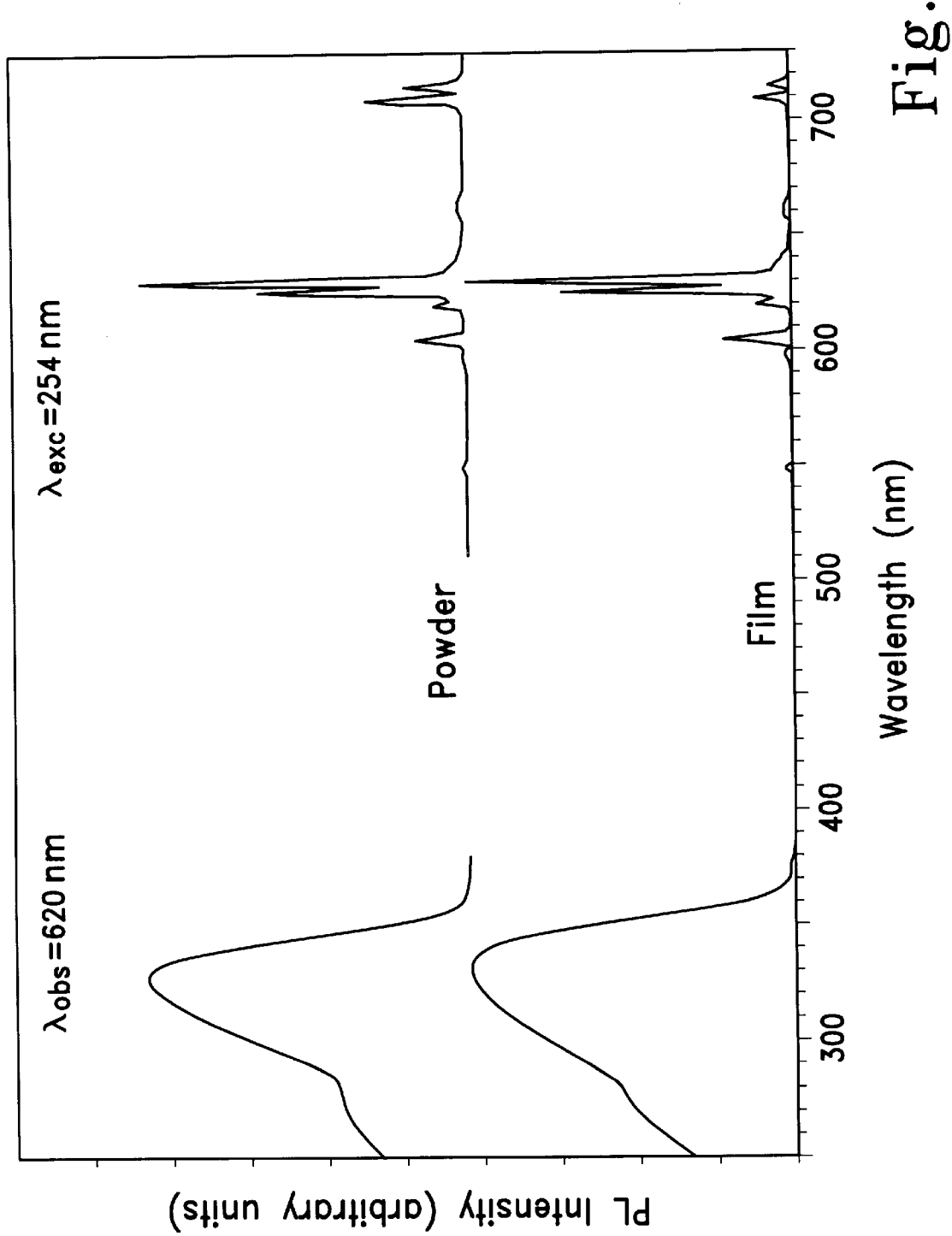
FIG. 5 illustrates excitation and emission spectra obtained from thin film and powder $Y_{0.82}Al_{0.07}La_{0.6}VO_4:Eu_{0.05}$ phosphors.

A polycrystalline $(Y_{0.82}Al_{0.07}La_{0.06})VO_4{:}Eu_{0.05}$ sample was prepared as described herein and high-resolution excitation/emission spectroscopy was performed on both the powder and a selected region of the thin film library as depicted in FIG. 5. The intrinsic and extrinsic quantum efficiencies of the $(Y_{0.82}Al_{0.07}La_{0.06})VO_4{:}EU_{0.05}$ phosphor material were quantitatively measured and compared as presented in Table 2, infra. Although the powder sample had considerably higher extrinsic efficiency, the intrinsic efficiency of the powder sample was indistinguishable from that of the thin film phosphor.

TABLE 2

Relative extrinsic and absolute intrinsic luminescent properties of thin films produced by electron beam evaporation and powders made of the same composition. Extrinsic efficiency as measured by the total measured visible light output from the film relative to the light output of a deep powder patch. The intrinsic quantum efficiency was determined by correcting for reflectivity and absorption.

| Compound | Intrinsic Photoluminescence Quantum Yield, $f_{1(nm)}$ | standard deviation, s | CIE chromaticity (1931), x, y | Relative extrinsic brightness[1] |
|---|---|---|---|---|
| $Y_{.845}La_{.06}Al_{.07}Eu_{.025}$ VO$_4$ powder | $f_{254} = 0.89$ | s = .04 | x = 0.67, y = 0.32 | 0.92 |
| $Y_{.90}Al_{.05}Eu_{.05}VO_4$ powder | $f_{254} = 0.82$ | s = .05 | x = 0.67, y = 0.32 | 0.83 |
| $Y_{.82}La_{.06}Al_{.07}Eu_{.05}$ VO$_4$ film | $f_{254} = 0.61$ | s = .20 | x = 0.63, y = 0.34 | 0.043 |
| $Y_{.85}Al_{.10}Eu_{.05}VO_4$ film | $f_{254} = 0.76$ | s = .12 | x = 0.67, y = 0.32 | 0.057 |

[1]Relative to the reference standards: $Y_2O_3$: Eu, $Y_2O_2S$: Eu, ZnS: Cu, Al, ZnS: Ag, Cl.

In yet another embodiment, a library of phosphor materials was prepared using sol-gel precursors, with the library having the general formula $$A_{3-z}B_5X_{12}{:}M_z.$$

In this embodiment, A is selected from the group consisting of Y, all lanthanides and mixtures thereof. B is selected from the group consisting of Al, Ga, In, Sc, and mixtures thereof. X is selected from the group consisting of O, F, S, and mixtures thereof. M is selected from the group consisting of Ce, Th, Pr, Sm, Eu, Dy, Ho, Tm, and mixtures thereof. Z is a number of about 0 to about 0.1.

Figure 6:
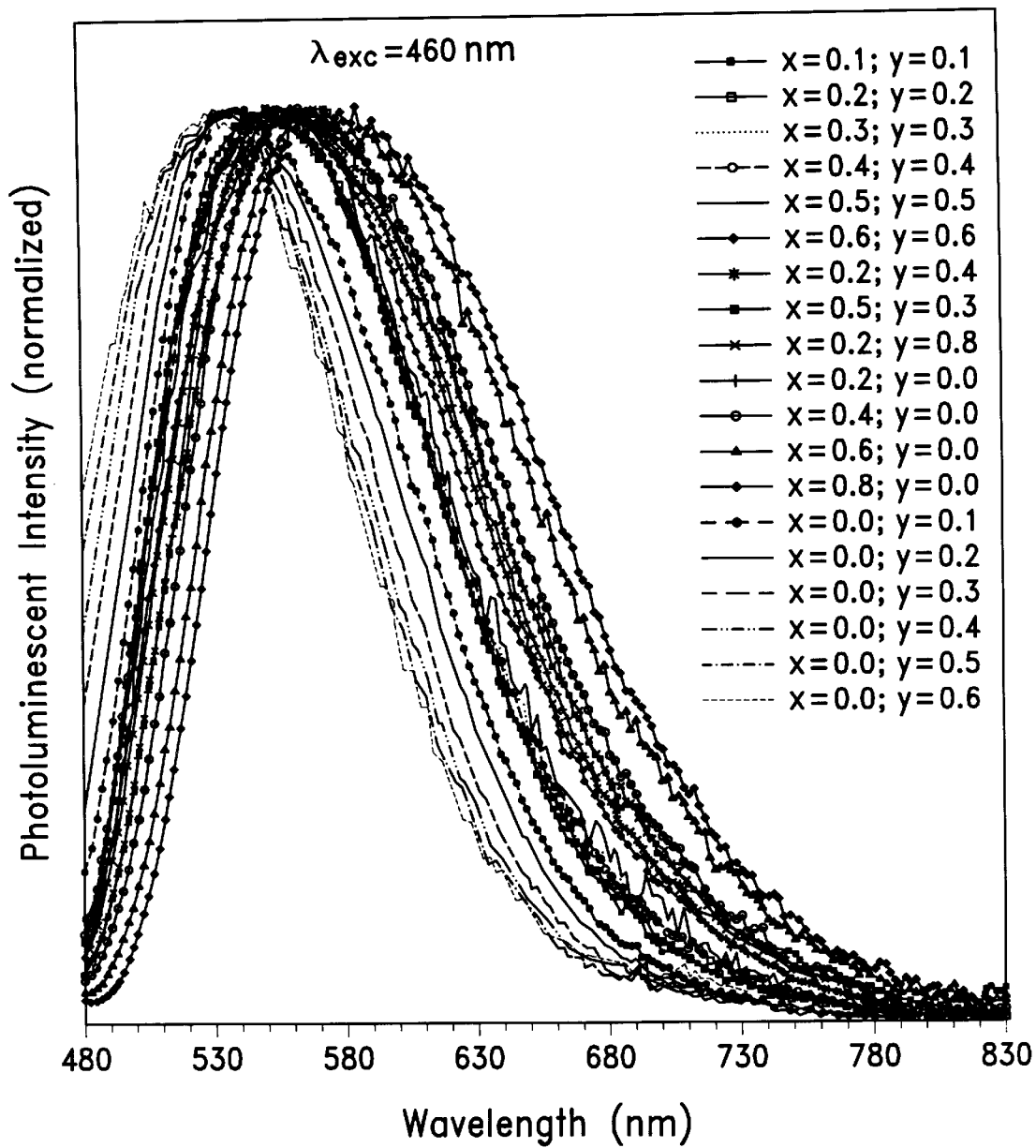
FIG. 6 illustrates emission spectra from a library of $(Y_{1-x}Gd_x)_{3-z}(Al_{1-y}Ga_y)_5O_{12}:Ce_z$ phosphors.
Figure 7:
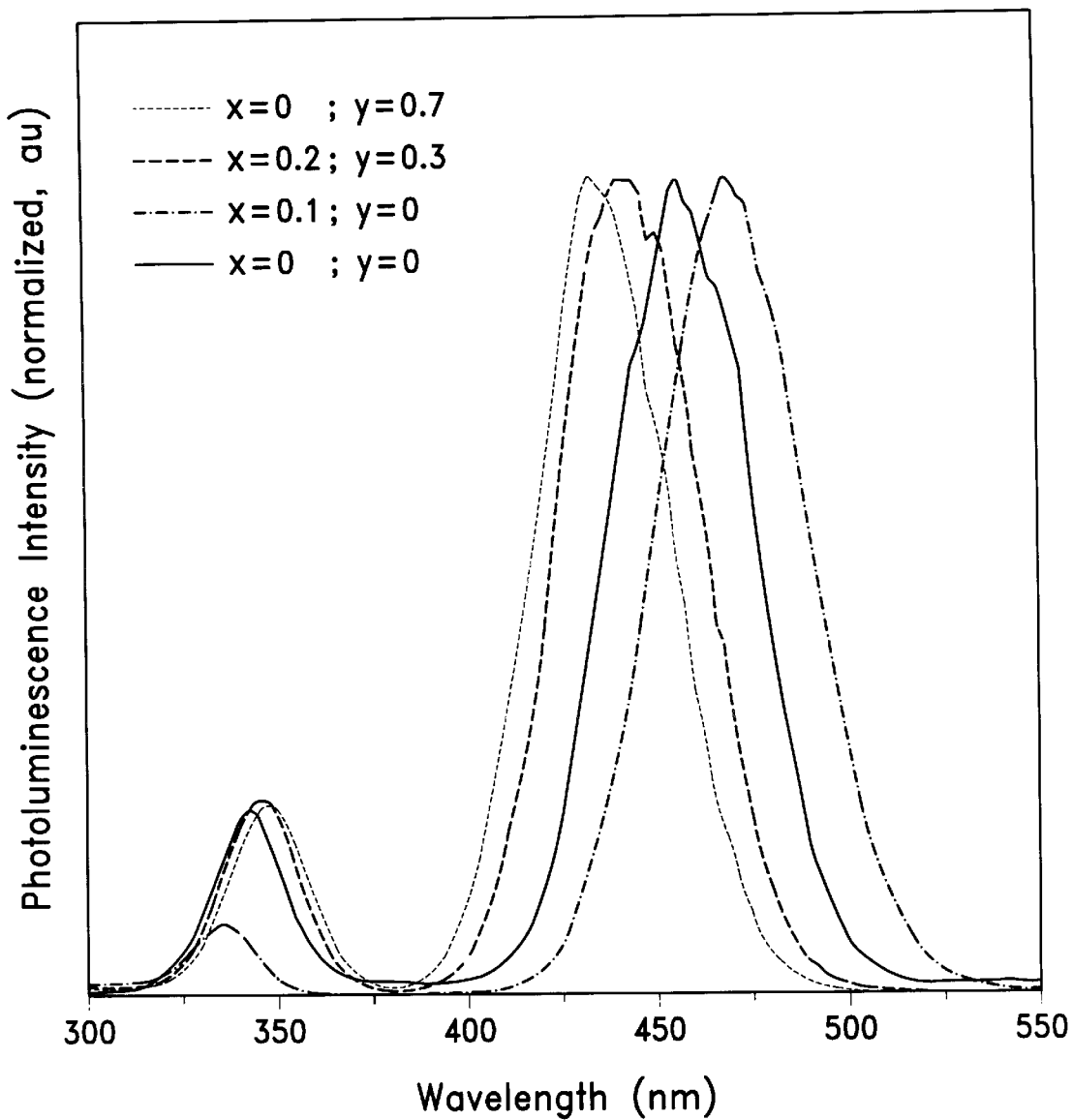
FIG. 7 illustrates an excitation spectra from selected compounds from a library of $(Y_{1-x}Gd_x)_{3-z}(Al_{1-y}Ga_y)_5O_{12}:Ce_z$ phosphors.

In this embodiment, a phosphor library was designed for the efficient excitation by blue or blue-green light (e.g., about 400–500 nm) with the concomitant photoluminescence at lower energy (e.g., about 500–600 nm). Generally, the library was created by first mixing solutions containing the desired components and subsequently delivering each solution to a substrate. After hydrolysis, gelation and high-temperature annealing, each element of the library was tested for its properties. Identification of the highest extrinsic efficiency library elements was performed by automatically searching the imaging date for those regions of the library with the highest values of luminance. FIG. 8 shows representative elements of the library along with their C.I.E., x, y coordinates (1931, 2 degree observer). FIGS. 6, 7 and 8 demonstrate the large spectral range spanned by the compositions disclosed herein.

More specifically, phosphor materials were prepared having the formula:

$$(Y_{1-x}Gd_x)_{3-z}(Al_{1-y}Ga_y)_5O_{12}{:}Ce_z,$$

where x is greater than zero and less than or equal to one; y is greater than zero and less than or equal to one; and z is greater than zero and less than about 0.3. Preferably, $0.1 \leq x \leq 0.7$, $0.1 \leq y \leq 0.7$ and $0.1 \leq z \leq 0.09$. More preferably, $0.3 \leq x \leq 0.6$, $0.3 \leq y \leq 0.6$ and $0.01 \leq z \leq 0.06$. In the most preferred embodiment, x=0.5, y=0.5 and z=0.03.

The present invention will be described in greater detail by way of specific examples. The following examples are offered for illustrative purposes, and are not intended to limit the invention in any manner. Those of skill in the art will readily recognize a variety of noncritical parameters which can be changed or modified to yield essentially the same results.

EXAMPLE 1

A phosphor library was designed (FIG. 1) to include combinations of host lattice cations from groups IIA and IIIA with substitutions by vanadium and from the group IIIB and IVB elements (International Union of Pure and Applied Chemistry (IUPAC) 1986 recommendations). In this library, representative compounds were included covering large nearly continuous regions of composition space for the selected hosts and the activator ions, Eu, Th, Tm and Ce. Libraries of compounds were synthesized as thin films by electron beam evaporation in vacuum on unheated silicon wafer substrates. The substrates were three-inch diameter (100) silicon wafers, ~400 microns thick, boron-doped to provide p-type conductivity. Wafers were washed in acetone and methanol and dried in a nitrogen stream. The electron beam system was a modified bell-jar vacuum chamber using a multiple target electron beam source. A multi-source electron gun was used with $La_2O_3$, $Y_2O_3$, MgO, $SrCO_3$, $SnO_2$, V, $Al_2O_3$, $Eu_2O_3$, $Tb_4O_7$, $Tm_2O_3$ and $CeO_2$ solid pellet or particle targets. Powders of these materials were pressed into pellets using a hydraulic press and steel dies. For evaporation, the pellets were placed in a graphite crucible that was inserted into the electron beam apparatus.

The electron beam was generated by a resistively-heated tungsten filament carrying 15–25 A and was accelerated by a 6 kV potential through a magnetic field which positioned the beam onto the target. The emission current was typically 20–50 mA. The magnetic field was created with a combination of permanent magnets and electromagnets, the latter of which were used during deposition to sweep the electron beam across the target and provide more uniform deposition. The base pressure of the chamber was ~$3 \times 10^{-6}$ Torr. During deposition, the pressure is typically $10^{-6}$–$10^{-5}$ Torr. The deposition rates were approximately 0.3 nm/s as monitored with an in situ quartz crystal deposition rate controller which was calibrated independently with ex situ thickness measurements. The controller was located adjacent to the substrate within the evaporation system and was calibrated with thickness measurements during separate evaporations. The total thickness of the library elements ranged across the library from 0.26 mm to 0.88 mm. The electron beam system was modified for combinatorial chemical deposition such that it contained a precision shutter apparatus to permit spatial variation of the species deposited and the relative amount of the species. A stainless steel primary mask consisting of 230 elements (1 $mm^2$) spaced 420 mm apart was attached to the substrate to effect physical separation of individual library elements. The spatial variation of materials deposited on the library was created using stationary and movable physical masks to control the thickness of specific evaporants in selected regions of the substrate, as indicated on the design map of FIG. 1. For selective deposition, several different stationary masks and moving shutters were used. In this example, two sets were used for the library described in FIG. 1, with one set having single 19.1 mm wide rectangular openings in each segment and the other having four 4.8 mm wide rectangular openings.

The constituents of each library element were deposited in layers. A density of approximately six hundred different possible compositions per square centimeter was achieved. The rare-earth ion activated mixed oxide thin film phosphors were synthesized with the nominal stoichiometry: $(A_iB_jC_k)_m O_n$:RE, wherein A, B and C=Al, La, Mg, Sn, Sr, V, Y, and RE=Eu, Th, Tm and Ce (see, FIG. 1. Interplanar mixing and formation of the inorganic compounds was accomplished by subsequent oxidative thermal processing at a variety of temperatures. Processing was performed as follows: After deposition, the library was transferred to a furnace and heated to 650–900° C. for 3 to 6 hours in air. Heating and cooling rates varied from 2° C./min to 10° C./min. In some cases, the libraries were held at 500° C. and/or at 900° C. for several hours. The large discovery library (FIG. 1) was heated initially to 500° C. at a rate of 4° C./min. After two hours at 500° C., it was heated to 850° C. at the same rate and held for 5 hours before cooling at 10° C./min to 100° C.

High-throughput screening of combinatorial libraries for UV-induced photoluminescence was performed by imaging the library's visible emission with a CCD in combination with a UV filter. The library was imaged in four segments at 2:1 minification onto the 25.9×27.5 mm CCD active area using a 120 mm lens, while exciting luminescence with UV lamps, used for excitation at approximately 1.2 $mW/cm^2$. A tricolor emission image of the library is depicted in FIG. 2. A semi-quantitative measure of chromaticity was obtained by acquiring three images using, respectively, red, green, and blue tristimulus emission filters with peaks 461 nm, 553 nm, 602 nm. Deep powder samples of three commercial phosphors, $Y_2O_3$:Eu(10%), (Zn,Cd)S:Ag, and ZnS:AgCl, $Y_2O_3$:Eu(10%) with x=0.629, y=0.350, ZnS:AgCl with x=0.266 y=0.576, and (Zn,Cd)S:Ag x=0.147 y=0.054) were similarly imaged under identical conditions to provide references and calibration for the chromaticity and relative luminosity estimates of each library member. Chromaticity was quantified by calculating the normalized chromaticity coordinates (x,y) as prescribed by the Commission Internationale de L'Eclairage (CIE), Colorimetry, 2nd Edition (1986) Publication CIE No 15.2, Central Bureau of the Commission Internationale de L'Eclairage, Vienna, Austria. The intensities from the images obtained with the red, green and blue tristimulas filters were weighted and combined to calculate the x,y CIE coordinates. The known CIE coordinates of the three standard phosphors were used to determine the weighing factors. The relative extrinsic efficiencies were estimated from the ratio of the measured output of the phosphor to the standards. The observed brightness or extrinsic efficiency must be used with caution unless comparing samples with identical reflectivity and absorption. Preliminary identification of the highest extrinsic efficiency phosphors with desirable red, green and blue chromaticity was performed by automatically searching the imaging data for those regions of the library with the highest intensity output within selected ranges of chromaticity (coordinates were as follows: red (x=0.6–0.7, y=0.3–0.4), green (x=0.0–0.3, y=0.5–0.8), and blue (x=0.0–0.3, y=0.0–0.1)). Table 1 lists the locations on the library of the extrinsically brightest red, green and blue phosphors within the specified chromaticities together with their relative intensities and C.I.E. (1931) coordinates.

EXAMPLE 2

One region of the library prepared in EXAMPLE 1 containing Sr, Ce and Sn luminesced blue under 254 and 366 nm UV excitation (see, FIG. 2). It was determined iteratively that the compound responsible for the blue emission was comprised of Sr, Ce and oxygen. Subsequent identification of the luminescent phase, $Sr_2CeO_4$, was achieved by X-ray diffraction of a bulk powder. Powder X-ray diffraction (PXRD) revealed that the powder consisted of approximately 80% $Sr_2CeO_4$ mixed with SrO and $CeO_2$. Pure $Sr_2CeO_4$ was then prepared by firing a stoichiometric mixture of nitrates and acetates at 1000° C. The compound, $Sr_2CeO_4$, was synthesized by firing a stoichiometric mixture of $SrCO_3$ and cerium (III) acetate at 1000° C. in air for 3 hrs. The powder was ground, pelletized and refired for 6 hours at 1000° C. After regrinding, the thermal cycle was repeated until single phase $Sr_2CeO_4$ was apparent by PXRD.

Figure 3:
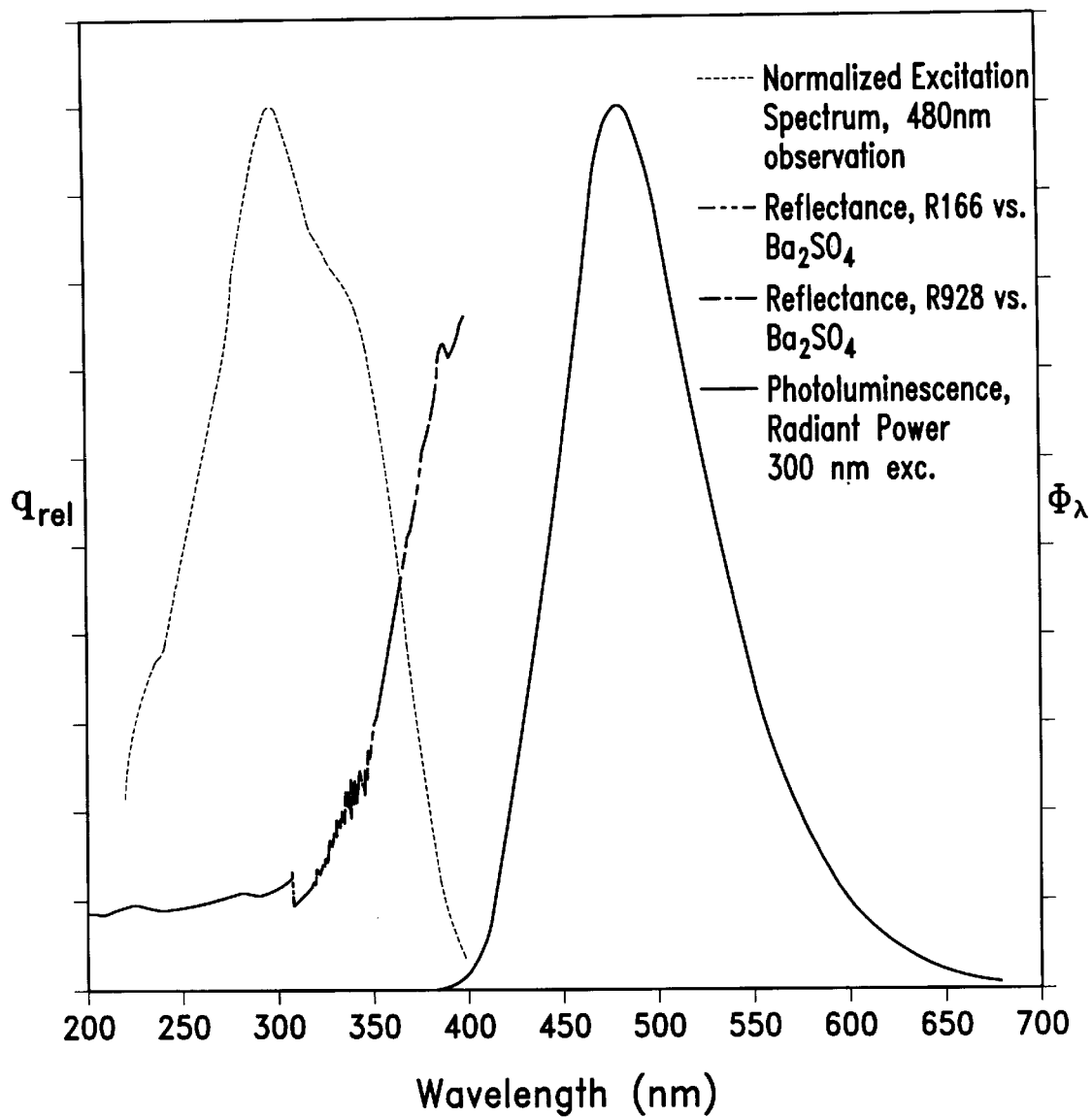
FIG. 3 illustrates a photoluminescence excitation, reflectance and emission spectra of polycrystalline $Sr_2CeO_4$.

Alternatively, a stoichiometric amount of $SrCO_3$ was suspended in water with stirring. The $SrCO_3$ was slowly neutralized with concentrated $HNO_3$ until a clear colorless solution was obtained. A stoichiometric amount of cerium (III) acetate was slowly added to the 50–80° C. solution. The well-stirred solution was dehydrated by heating to 100° C. to 120° C. under a stream of nitrogen. The resulting white paste was dried at 150° C., finely ground, pressed into a pellet and heated to 1000° C. The polycrystalline samples were successfully indexed to the JCPDS card number 22-1422, with no impurity phases observed. Powder X-ray diffraction was performed using Cu Kα radiation on a Scintag X1 diffractometer. Subsequently, the structure of $Sr_2CeO_4$ was solved ab initio from PXRD data and refined using the Rietveld method. Crystallographic data of $Sr_2CeO_4$ was obtained and confirmed the results. The optical properties of $Sr_2CeO_4$ were characterized (see, FIG. 3) illustrating photoluminescence spectra and X-ray data of polycrystalline $Sr_2CeO_4$.

EXAMPLE 3

Libraries of $Sr_2CeO_4$ and related substituted compounds were also prepared by solution deposition techniques. Combinatorial solution precursor libraries were deposited on substrates or wafers such as quartz, glass, silicon, sapphire, aluminum oxide, magnesium oxide and lanthanum aluminum oxide.

Metal alkoxide sol-gel precursors were generally used for the preparation of liquid-deposited combinatorial libraries. As-purchased starting materials, such as strontium isopropoxide and cerium isopropoxide, were refluxed in 2-methoxyethanol for up to 6 hours. 0.5 to 2 equivalents of stabilizing additives, such as 2,4-pentanedione (acetylacetonate), alkanolamines and 2-ethylhexanoic acid, were added to prevent precipitation and slow hydrolysis rates. Additional reagents, such as ethylene glycol, were also added in aid in wetting the substrate surface and to reduce cracking in the resulting film. The resulting solutions were dispensed automatically onto the substrate surface.

Using an automated liquid dispensing system, a ternary phase space was constructed. Volumes of each solution were dispensed into a 96-well microtiter plate in ratios such that 100 μL of metal solution was present in 66 wells for the purpose of creating an 11×11×11 triangular matrix of (Ba, Sr, Ca)$_2$CeO$_4$. Rows of the triangle were decremented in units of 10% resulting in 100% $Sr_2CeO_4$, 100% $Ba_2CeO_4$ and 100% $Ca_2CeO_4$ compositions at the three corners of the triangle. 15–25 μL of ethylene glycol was added to each microtiter well to assist in efficiently wetting the substrate surface ensuring film quality. To insure adequate mixing, the microtiter plate was occasionally placed on an agitator table for 10 minutes. 0.5–3 μL of each solution was then deposited onto the substrate either in an automated fashion using the liquid dispensing system or manually using an Eppendorf micropipette.

Solution-deposited combinatorial libraries were allowed to gel under an ambient atmosphere or in an atmosphere of 2-methoxyethanol. After gelation, libraries were gradually dried and calcined through a heating cycle consisting of slow (0.5° C./minute) ramping followed by 2 hours at 120° C., 1° C./minute ramp and 2 hours at 180° C., 1° C./minute and 6 hours at 500° C. and 1° C./minute and 6 hours at 900° C. Further heating was performed depending on phase purity as seen by PXRD.

Rectangular libraries, such as $(La,Sr)_2(Ce,Tb)O_4$, were also prepared in a manner analogous to that described above.

EXAMPLE 4

The highest efficiency materials with desirable chromaticity identified in the initial high-density exploration library (FIG. 1) were red phosphors (Eu-doped) consisting of yttrium vanadates with aluminum substitutions as the host. Combinations containing vanadium and vanadium-aluminum were added because aluminum substitutions in vanadates have been shown empirically to increase luminosity (see, Ozawa, et al., *Chem. Abstr.*, 72:16741). To investigate and optimize these compounds, a second library was designed which focused on the lead compositions and included lanthanum as a second Group IIIA host, as depicted in FIG. 4A. For the focus library, an equilateral triangular mask with 50 mm sides was used together with a solid moving shutter. The triangular vanadate library (FIG. 4A) was heated initially to 650° C. at a rate of 2° C./min. After three hours at 650° C., it was cooled to 100° C. at 2° C./min and removed for initial screening. The library was then reheated to 900° C. at a rate of 4° C./min and held for 6 hours before cooling at 4° C./min to 100° C.

Selected compositions of yttrium vanadates doped with lanthanum have been previously described as efficient lamp and cathodoluminescent phosphors (see, Yokota, et. al., *Chem. Abstr.*, 75:103573). This comprehensive composition map represents all possible $Y_{0.95-n-m}La_nAl_m(VO_4)Eu_{0.05}$ compounds. A UV-excited photoluminescent image of the library is depicted in FIG. 4B. The most intense phosphor on the library with red chromaticity suitable for a commercial material was $(Y_{0.82}Al_{0.07}La_{0.06})VO_4:Eu_{0.05}$. This composition represents a new phosphor with excellent extrinsic properties.

The $(Y_{0.82}Al_{0.07}La_{0.06})VO_4:Eu_{0.05}$ was then prepared as a powder by conventional methods as follows: Europium-doped vanadates of the general formula $Y_{0.975-n-m}La_nAl_mEu_{0.025}VO_4$ were prepared by firing the well mixed stoichiometric oxides for 3 hrs at 1000° C., followed by regrinding and refiring. The brown powders thus obtained were then stirred in 2 molar $NaOH_{(aq)}$ for approximately 20 minutes at 60° C. (to remove traces of unreacted $V_2O_5$), followed by vacuum filtration and several water washings. After drying in air, this procedure yielded strongly luminescent (254 nm) off-white vanadate powders.

High-resolution excitation/emission spectroscopy was performed on both the powder and a selected region of the thin film library which showed identical absorption and emission properties as depicted in FIG. 5. Similar comparisons were performed on several additional thin films and their corresponding powders from other libraries and non-optimal regions of the focus library. In all cases, the bulk powder spectra were indistinguishable from the thin films indicating that the host-dopant interactions were identical. The intrinsic and extrinsic quantum efficiencies of the $(Y_{0.82}Al_{0.07}La_{0.06})VO_4:Eu0.05$ were quantitatively measured and compared as presented in Table 2. Measurements were made using a dual monochromator spectrometer with care taken to insure equal detector solid angles. The absolute source intensity, $I_o(l)=S(l)/(PMT(l)^* q^* QE_{NaSal})$, was determined from the measured PMT signal, $S(l)$, using sodium salicylate as a quantum counter (NaSal has a nearly constant quantum efficiency between approximately 25 nm and 400 nm). Detector response was calibrated with a Labsphere certified reflectance standard, $D(l)=R(l)$. The quantum efficiency was determined as, $QE_r=I(l_{cm})/(I_o(l_{ex})-I_{refl}(l_{ex}))$.

Although, as expected, the powder sample had considerably higher extrinsic efficiency, the intrinsic efficiency of the powder sample was indistinguishable from that of the thin film phosphor on the library.

Additional triangular vanadate libraries were also prepared using solution deposition methods such as are described in EXAMPLE 3.

EXAMPLE 5

Sol-gel libraries were deposited on silicon wafer substrates. Stock solutions of yttrium isopropoxide, aluminum isopropoxide, gadolinium isopropoxide and gallium isopropoxide were prepared in 2-methoxyethanol (0.25 M) refluxing under Argon for 8 hours. To each of the four stock solutions of yttrium, gadolinium, aluminum and gallium in methoxyethanol (0.25 M), 1 equivalent of 2,4-pentandione was added with stirring, followed by the addition of anhydrous ethylene glycol (15% v/v). The yttrium and gadolinium solutions contained $Ce(NO)_3.6H_2O$ at 1.0 mol % as the dopant source.

Synthesis of a library occurred in two separate steps. In the first step, the individual components of the library were mixed from the stock solutions into a standard 96 well polypropylene microtiter plate, with automated dispenser described in Example 3, generating the desired compositional array. Synthesis of an 11×11 library of $(Y_{1-x}Gd_x)_{3-z}(Al_{1-y}Ga_y)_5O_{12}:Ce_z$ (where z=0.03) was performed as in Example 3, where $0 \leq x \leq 1$ and $0 \leq y \leq 1$ in increments of 0.1 for x and y.

The second step in the library synthesis was transferring the mixed solution from each well on the microtiter plate onto the silicon wafer for high temperature processing. Approximately 2.2 μl from each well was transferred to isolated locations on the wafer. After gelation took place (about 2 days), the sol-gel libraries were annealed using typical high-temperature processing producing highly-crystalline, single-phase materials as evidenced by X-ray diffraction analysis.

All library elements were found to be of the proper garnet phase. High-throughput screening of the libraries for 460 nm excited photoluminescence was performed by imaging the library's visible luminescence with a CCD detector while exciting with the suitably filtered output (460 nm peak, 30 nm FWHM) of an Hg/Xe lamp fiber optically coupled to the system. Inhomogeneities in the illumination field were compensated for by means of image processing. Quantitative measure of chromaticity was calculated from three images obtained using, respectively, red, green and yellow bandpass filters. Calibrated light-emitting diodes were imaged under identical conditions to provide references and calibration for the chromaticity and luminance of each library member. Preliminary identification of the highest extrinsic efficiency library elements was performed by automatically searching the imaging data for those regions of the library with the highest values of luminance (see, FIGS. 8A, 8B and 8C).

Figure 8A:
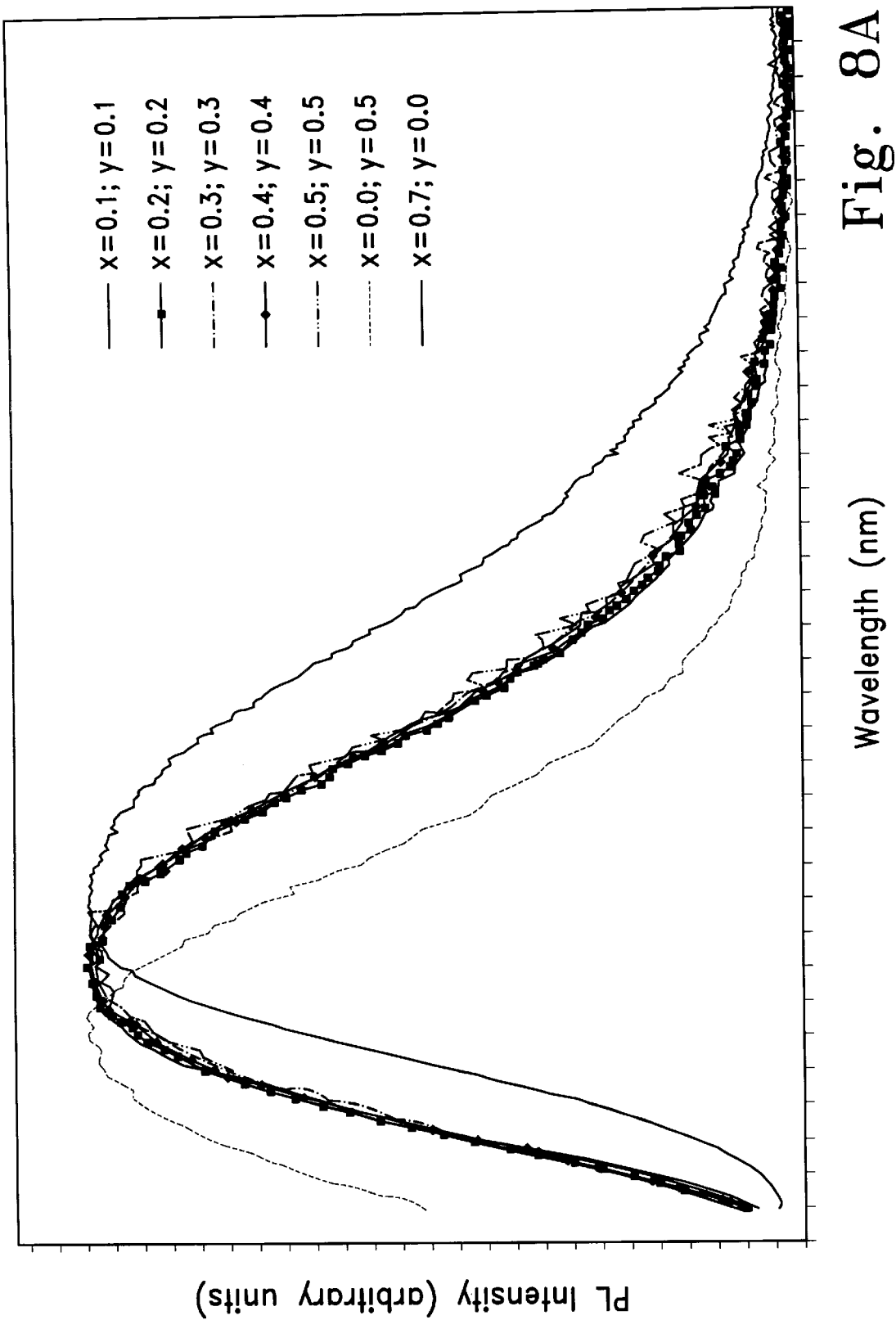
Figure 8C:
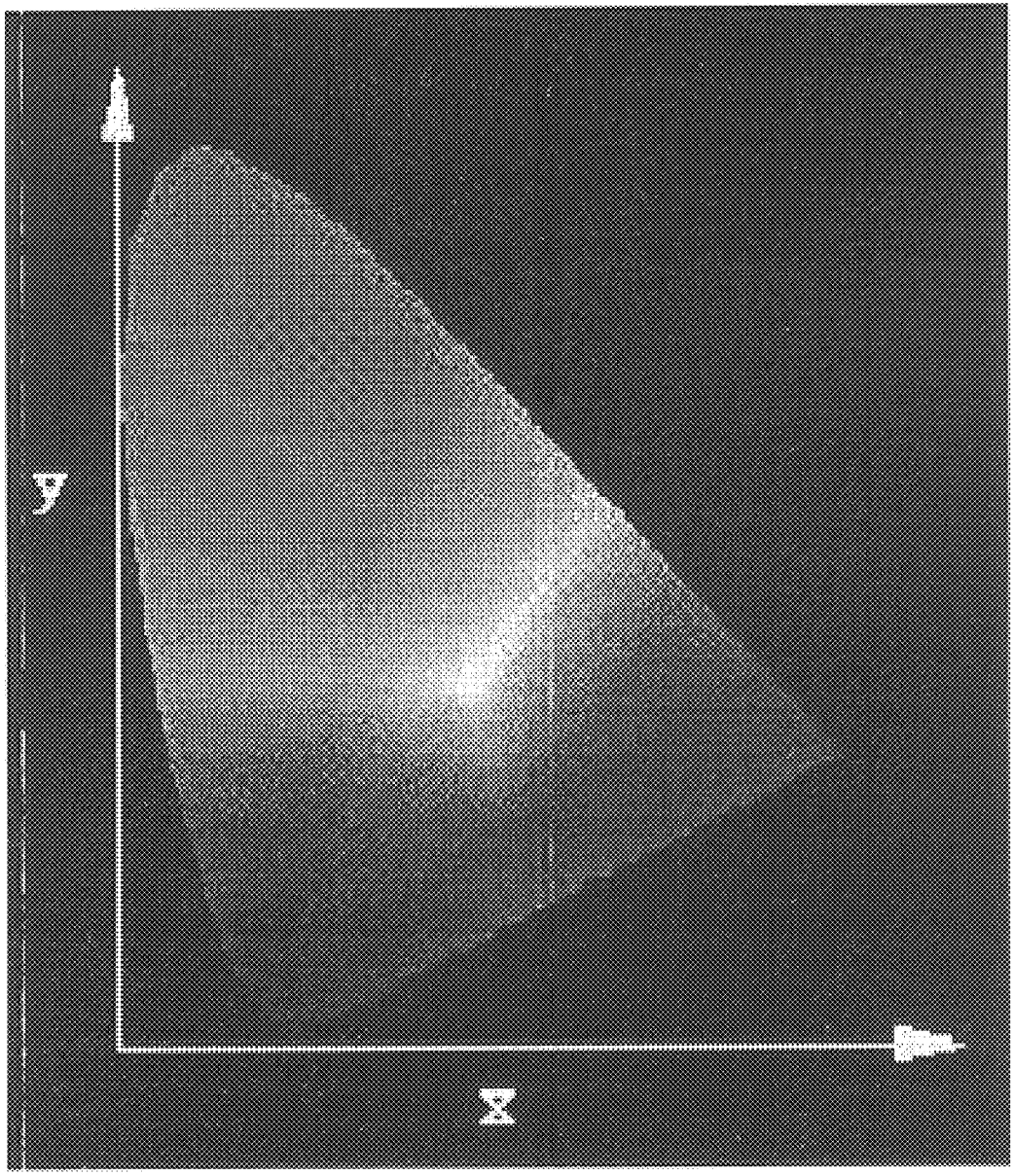

High-resolution fluorescence spectroscopy was performed on all the elements of the library by positioning the individual library elements within a modified Spex 222. The spectrofluorimeter was operated in photon counting mode with source compensation performed by referencing against Rhodamine-6G in ethylene glycol. Excitation (250–500 nm, FIG. 7) and emission (500–830 nm, FIG. 6) spectra were collected for each library element. The total integrated luminescence was determined at each library element and the results were found to correlate well with the CCD data. Proper choice of stoichiometry permits one of skill in the art to select a material that is most efficiently excited by a variety of blue light sources (425–475 nm) (including light-emitting diodes). Of additional interest is the ability to tune the chromaticity of the materials in a systematic manner by controlled substitution at either the Y/Gd and/or the Al/Ga cation sites. As shown in FIGS. 8A, 8B and 8C, the 1931 C.I.E. x coordinate varies between 0.336 and 0.498, while the y coordinate simultaneously varies between 0.574 and 0.493. This systematic change provides the ability to tune the color of photoluminescence in a controlled manner with obvious implications for affecting the color rendition index of a resulting "white" light source (light-emitting diode). By proper choice of stoichiometry based on both the excitation and photoluminescence spectra, an optimized phosphor may be selected for a range of blue light sources (including light-emitting diodes).

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A phosphor material that is $Sr_2CeO_4$, wherein the $Sr_2CeO_4$ is orthorhombic.

2. The phosphor material of claim 1, wherein the phosphor material $Sr_2CeO_4$ comprises linear chains of edge-sharing $CeO_6$ octahedra.

3. A phosphor material that is $(Y_{0.82}Al_{0.07}La_{0.06})VO_4:Eu_{0.05}$.

4. A method comprising providing a phosphor comprising $Sr_2CeO_4$, stimulating the phosphor with radiation and observing luminescence from said phosphor.

5. The method of claim 4, wherein said radiation is selected from the group consisting of X-ray, ultraviolet or electron.

6. The method of claim 4, wherein said luminescence is selected from the group consisting of photoluminescence, electroluminescence and cathodoluminescence.

* * * * *